United States Patent [19]

Reichert et al.

[11] Patent Number: 5,024,358
[45] Date of Patent: Jun. 18, 1991

[54] THERMAL-INSULATED FLUID RECEPTACLE REMOVABLY SUPPORTED ON BICYCLE FRAME

[75] Inventors: Ricardo H. Reichert, Pasadena; Alberto J. Reichert, West Covina, both of Calif.

[73] Assignee: Schlumberger Industries Limited, Hampshire, England

[21] Appl. No.: 440,340

[22] Filed: Nov. 22, 1989

[51] Int. Cl.⁵ .................................................. B62J 9/00
[52] U.S. Cl. ................................... 224/35; 224/32 R; 224/148
[58] Field of Search ............. 224/148, 35, 32 R, 30 R, 224/39, 30 A, 36, 37, 38

[56] References Cited

U.S. PATENT DOCUMENTS

| | | |
|---|---|---|
| 522,186 | 7/1894 | Andrews . |
| 581,767 | 5/1897 | Powers . |
| 637,733 | 11/1899 | Hall .................................. 224/30 A |
| 672,540 | 4/1901 | Speir ..................................... 224/35 |
| 942,306 | 12/1909 | Clarke . |
| 2,002,777 | 5/1935 | Johnson . |
| 2,907,534 | 10/1959 | Benstein . |
| 3,189,171 | 6/1965 | Miller . |
| 3,198,397 | 10/1963 | Bello . |
| 3,487,858 | 1/1966 | Hanback . |
| 3,741,429 | 6/1973 | Purcell . |
| 3,777,955 | 12/1973 | Davies . |
| 3,840,153 | 10/1974 | Devlin . |
| 3,981,166 | 9/1976 | Madonna . |
| 4,009,810 | 3/1977 | Shook . |
| 4,090,650 | 5/1978 | Gotta . |
| 4,095,812 | 6/1978 | Rowe . |
| 4,193,525 | 3/1980 | Sommers . |
| 4,274,566 | 6/1981 | Rowe . |
| 4,366,922 | 1/1983 | Levine et al. . |
| 4,441,638 | 4/1984 | Shimano . |

FOREIGN PATENT DOCUMENTS 514211 2/1955 Italy .................................. 224/30 A
WO87/02873 5/1987 PCT Int'l Appl. ................ 224/148

Primary Examiner—Linda J. Sholl
Attorney, Agent, or Firm—Sanford J. Asman

[57] ABSTRACT

A liquid bottle is efficiently carried by a bicycle having a tubular frame that includes a forwardly extending first tube projecting forwardly from near the seat to the steering column, and a second tube projecting downwardly and rearwardly from the steering column at an angle α relative to the first tube and toward the pedal rotor bearing, the two tubes defining an upright frame plane that extends forwardly. The liquid bottle apparatus has substantially flat, relatively narrow, opposite side walls which are substantially parallel and adapted to extend in parallel relation to the frame plane when the bottle is positioned between the first and second tubes; the bottle having a forwardly elongated upper side adapted to extend parallel to and beneath the first tube; the bottle having a forwardly and upwardly elongated lower side adapted to extend parallel to and above the second tube; a first snap connector integral with the bottle and projecting above the upper side thereof to snap connect to the first tube, and a second snap connector integral with the bottle and projecting forwardly and downwardly below the lower side thereof to snap connect to the second tube; and duct means extends within the bottle interior and to the upper exterior of the bottle so that a bicyclist can insert the upper end of the duct means into his mouth to withdraw liquid from the bottle while riding. The external body of the bottle is made of a suitable FDA approved foamed plastic to provide such bottle with thermal-insulating properties.

7 Claims, 3 Drawing Sheets

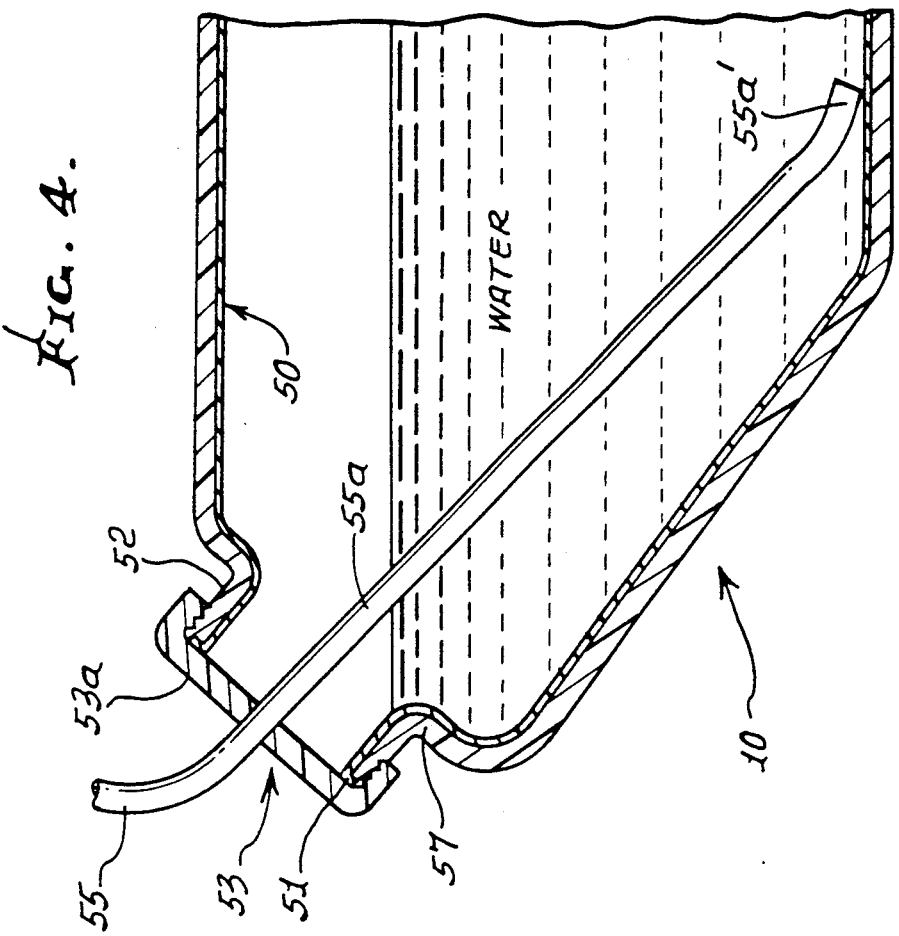
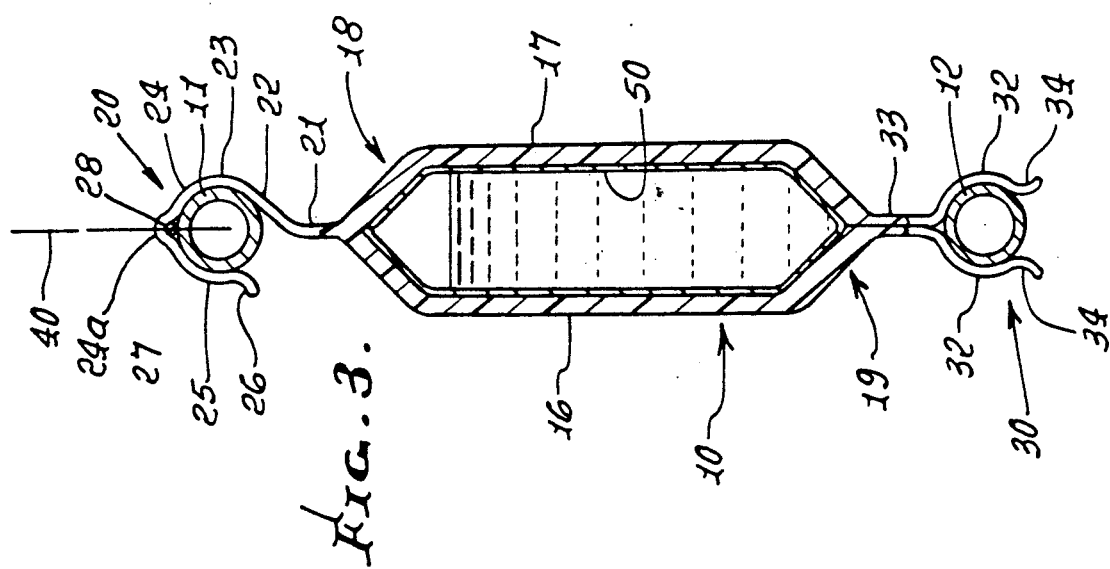

THERMAL-INSULATED FLUID RECEPTACLE REMOVABLY SUPPORTED ON BICYCLE FRAME

BACKGROUND OF THE INVENTION

This invention relates generally to liquid or water bottles, and more particularly to such bottles attachable to bicycle frames for use by cyclists during cycling.

There is need for water bottles that are quickly and easily attachable to, and detachable from, bicycle frames, to enable drinking and refilling; and there is need for such bottles to alternately allow drinking with the bottle in place on the frame, and quick detachment from the frame for drinking directly from the bottle while cycling. No prior bottle of which we are aware provides these features as well as the unusually advantageous and simple structure, multiple functions, and advantageous results now provided by the present bottle.

SUMMARY OF THE INVENTION

It is a major object of the invention to provide a liquid-containing bottle, easily snap connected to bicycle frame tubes with generally unidirectional motion, downwardly; and to be easily disconnected from such tubes with generally unidirectional motion, upwardly, whereby the cyclist can easily elevate the container to drink from it, if desired.

It is another object to provide such snap connection to frame tubes that are not parallel, so that the tubes themselves hold the snap on connected bottle against travel lengthwise of the tubes.

Basically the invention is embodied in bottle apparatus comprising:

(a) a substantially flat, relatively narrow bottle having opposite sides which are substantially parallel and adapted to extend in parallel relation to the frame plane when the bottle is positioned between the first and second tubes, (b) the bottle having a forwardly elongated upper side adapted to extend parallel to and beneath the first tube, (c) the bottle having a forwardly and upwardly elongated lower side adapted to extend parallel to and above the second tube, (d) a first snap connector integral with the bottle and projecting above the upper side thereof to snap connect to the first tube, and a second snap connector integral with the bottle and projecting forwardly and downwardly below the lower side thereof to snap connect to the second tube, (e) and duct means extending within the bottle interior and to the upper exterior of the bottle so that a bicyclist can insert the upper end of the duct means into his mouth to withdraw liquid from the bottle.

As will be seen, the first connector typically has laterally opposed forwardly elongated sides to engage and grip opposite sides of the first tube, and the second snap connector has laterally opposed, forwardly and upwardly elongated sides to engage and grip opposite sides of the second tube, whereby the bottle is firmly positioned and held to the frame against rotation about either the tube and against displacement lengthwise relative to either of the first and second tubes.

Further, the connectors advantageously may have divergent terminal portions adapted to receive the tube therebetween and to be yieldably spread apart as the terminal portions are snapped onto and off the frame tubes.

A further object is to provide a bladder in the bottle to receive the liquid, the duct means communicating with the bladder interior. As will appear, the bottle may have a relatively short forward corner side that extends downwardly at an angle relative to the bottle upper side, the corner side defining an opening to the bottle interior, and including a bottle neck registering with that opening, a cap removably attached to the neck, and the duct extending through the cap.

Finally, the first connector may have hook shape to be received downwardly on the first tube as the second connector is received downwardly and forwardly onto the second tube, unidirectionally.

The bottle itself may have streamlined, flat shape; and it typically has flat opposite outer sides for graphic display of identification numbers, as often desired during racing.

These and other objects and advantages of the invention, as well as the details of an illustrative embodiment, will be more fully understood from the following specification and drawings, in which:

DRAWING DESCRIPTION

FIG. 3 is a section taken on lines 3—3 of FIG. 2;

FIG. 4 is a side elevation taken in section showing the bottle interior construction.

DETAILED DESCRIPTION

Figure 1:
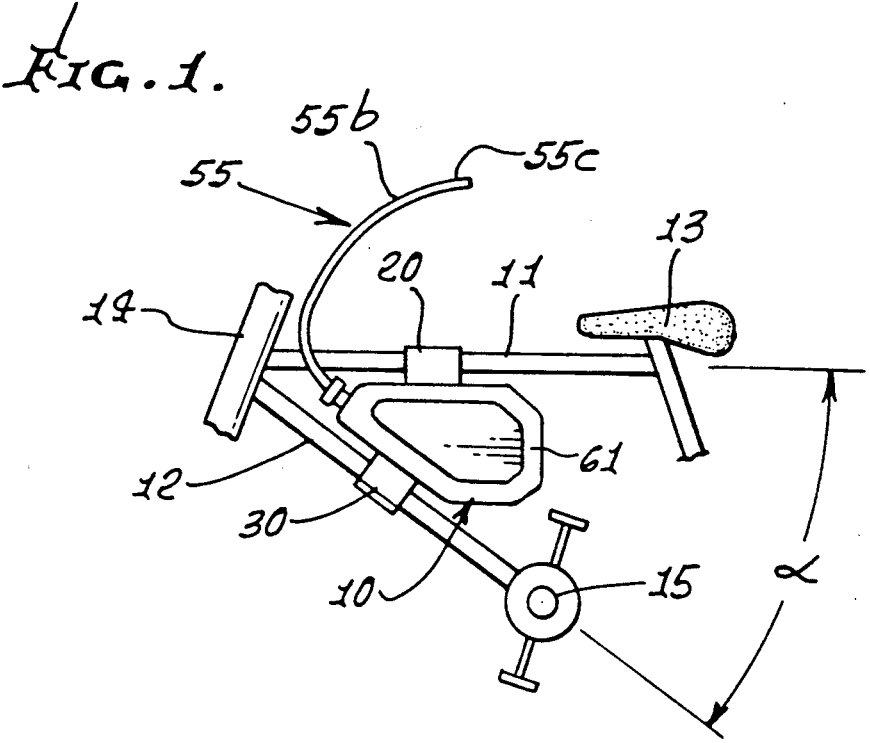
FIG. 1 is a side elevation showing the bottle of the invention attached to a bicycle frame.

In the drawings, the bottle 10 is adapted for use with a bicycle having a tubular frame including a forwardly extending first tube projecting forwardly from near the seat to the steering column, and a second tube projecting downwardly and rearwardly from the steering column at an angle $\alpha$ relative to the first tube and toward the pedal rotor bearing, the two tubes defining an upright frame plane that extends forwardly. See for example bicycle first tube 11, second tube 12, seat 13, steering column 14, pedal rotor bearing 15, and the plane 40 defined by tubes 11 and 12.

The bottle 10 has substantially flat, relatively thin opposite sides which are substantially parallel and adapted to extend in parallel relation to said frame plane 40 when the bottle is positioned between said first and second tubes. See for example opposite sides 16 and 17 in FIG. 3, parallel to plane 40. Such flat sides are relatively large, and adapted for graphics display, as for identification numbers during racing.

Figure 2:
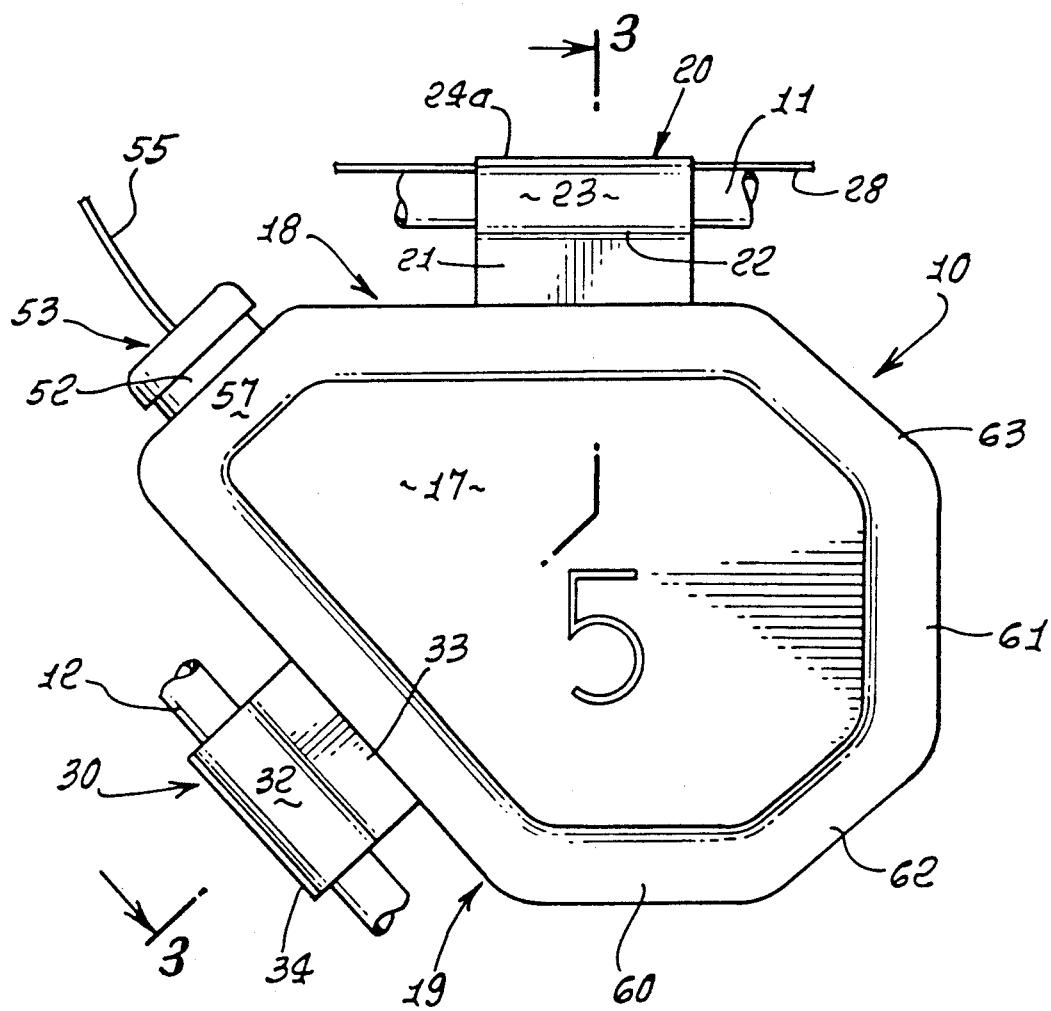
FIG. 2 is an enlarged side elevation showing the improved bottle.

Also, the bottle has a forwardly elongated upper side 18, which tapers upwardly, and is adapted to extend parallel to and beneath the upper tube 11; and the bottle has a forwardly and upwardly elongated lower side 19 that tapers downwardly and rearwardly, and is adapted to extend parallel to and above the second tube 12. Thus, the bottle forward extent has wedge shape, as is seen from FIGS. 1 and 2, defining angle $\alpha$. Side 19 itself tapers forwardly along its length, to provide streamline air flow over the bottle.

A first snap-on connector 20 is integral with the bottle and projects from and above the upper side 18 to snap connect to tube 11. As shown, connector 20 has hanger or hook shape, extending upwardly at 21 from the apex of side 18, then laterally at 22, upwardly at 23, laterally at 24, downwardly at 25, and divergently at 26. A raised domed portion 24a of side 24 provides a space 27 for passage of a control cable such as a brake cable 28 adjacent tube 11. As the connector is received downwardly on tube 11, it resiliently spreads apart and snaps onto the tube. It may be made of metal or plastic material.

A second snap-on connector 30 is integral with the bottle and projects from and below the bottle lower side 19, forwardly and downwardly to snap connect to the second tube 12, as the bottle is lowered so as to snap connect the C-shaped connector 30 onto tube 12, i.e., generally unidirectionally downwardly and forwardly. This then allows the bottle to be upwardly disconnected from the tubes, with one motion, whereby the cyclist can easily manipulate the bottle, as he needs, for drinking from it. Note the lower connector opposite sides 32 in FIG. 3, extending downwardly and forwardly from stem 33, and having divergent terminals 34 to spread apart resiliently, as the connector 30 is snapped onto tube 12. The two tubes 11 and 12 being non-parallel, tend to hold the bottle against movement along the tube lengths due to positioning of the two connectors 20 and 30.

A bladder 50 is received in the bottle, and has a mouth 51 attached to the inner wall of the bottle neck 52. Neck 52 is integral with bottle forward corner side 57, which also tapers forwardly. A cap 53 is attached to the neck, as at threads 54, and a flexible drinking duct 55 extends through the cap wall 53a. Its lower extent 55a is in the bladder interior to terminate at 55a', and its elongated upper end 55b projects upwardly for ease of drinking when end 55c is placed into the cyclist's mouth. When the bottle is lifted off the frame, the cap may be removed for refilling the bladder or for drinking directly from the bottle neck.

Note, finally, the bottle lowermost side 60 that tapers downwardly, and rear side 61 that tapers rearwardly, from angled corner portions 62 and 63.

Figure 5:
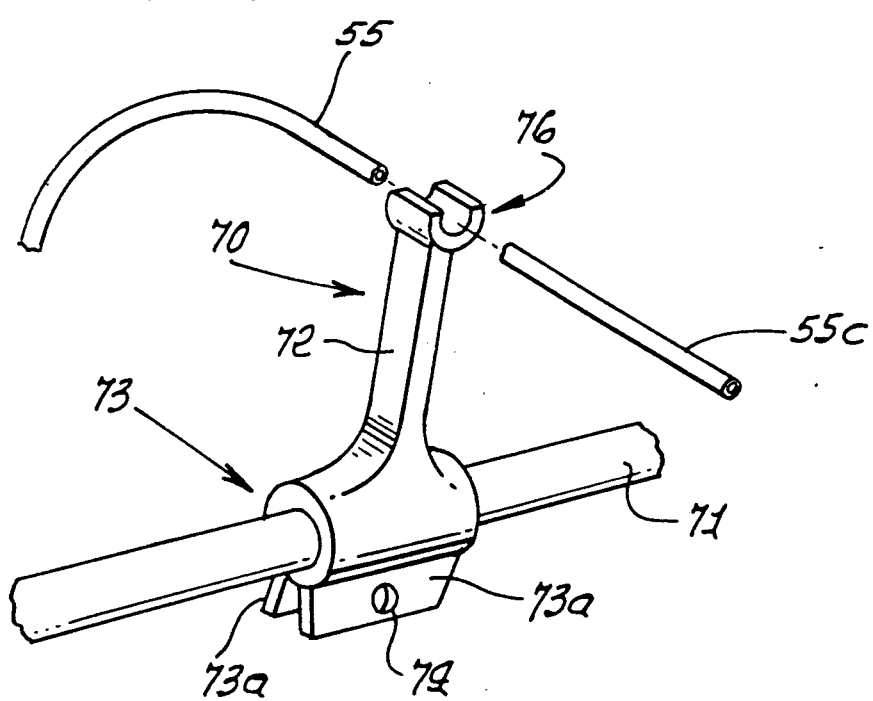
FIG. 5 shows a tube holder.

FIG. 5 shows a holder 70 for the drinking duct, the holder adjustably attached to the handle bar 71 of the bicycle. See upright stem 72 integral with a horizontally tubular clamp 73 that passes the handle bar. A fastener 74 is tightenable to urge the clamp flanges 73a toward one another. Stem 72 terminates at a U-shaped receptacle 76 for the drinking duct 55. That duct is pushed down into the receptacle, and held in position frictionally. Stem 72 may be rotated forwardly and rearwardly about the handle bar axis to elevate or lower the duct 55 and hold it in position as best suits the rider. The opposite end of the duct fits in the bottle.

We claim:

1. For use with a bicycle having a tubular frame including a forwardly extending first tube projecting forwardly from near the seat of the steering column, and a second tube projecting downwardly and rearwardly from the steering column at an angle relative to the first tube and toward the pedal rotor bearing, the two tubes defining an upright frame plane that extends forwardly, an improved liquid bottle apparatus comprising in combination:

(a) a substantially flat, relatively narrow bottle having opposite sides which are substantially parallel and adapted to extend in parallel relation to said frame plane when the bottle is positioned between said first and second tubes, (b) the bottle having a forwardly elongated upper side adapted to extend parallel to and beneath the first tube, (c) the bottle having a forwardly and upwardly elongated lower side adapted to extend parallel to and above the second tube, (d) a first snap connector integral with the bottle and projecting above said upper side thereof to snap connect to the first tube, and a second snap connector integral with the bottle and projecting forwardly and downwardly below said lower side thereof to snap connect to the second tube, (e) and duct means extending within the bottle interior and to the upper exterior of the bottle so that a bicyclist can insert the upper end of the duct means into his mouth to withdraw liquid from the bottle.

(f) said first snap connector having laterally opposed forwardly elongated sides with hook shape to hook over the first tube and to engage and grip opposite sides of the first tube, and said second snap connector has like laterally opposed, forwardly and upwardly elongated and spaced apart sides to resiliently spread apart and engage and grip opposite sides of the second tube, whereby the bottle is firmly positioned and held to the frame against rotation about either tube and against displacement lengthwise relative to either of the first and second tubes, the connectors having divergent portions adapted to receive the tubes therebetween and to be yieldably spread apart as said portions are snapped onto the tubes, (g) the bottle having a relatively short forward corner side that extends downwardly at an angle relative to said bottle upper side, said corner side defining an opening to the bottle interior, and including a bottle neck registering with said opening, a cap rearwardly attached to said neck, and said duct extending through the cap.

2. The apparatus of claim 1 wherein said connector opposite sides have curvature corresponding to the curvature of said tubes.

3. The combination of claim 1 wherein including a bladder in the bottle to receive said liquid, said duct means communicating with the bladder interior.

4. The combination of claim 1 wherein the bottle consists of molded plastic material.

5. The combination of claim 1 including said bicycle frame with said tubes to which said connectors are connected.

6. The combination of claim 1 including a duct means holder adjustably attachable to a bicycle handle bar, the duct means held by the holder.

7. The combination of claim 6 where the holder includes a base in the form of a clamp attachable to the handle bar and rotatable on and relative thereto, and a stem projecting from the base and defining a retainer to frictionally retain the duct means.

* * * * *

UNITED STATES PATENT AND TRADEMARK OFFICE
CERTIFICATE OF CORRECTION

PATENT NO. : 5,024,358

DATED : June 18, 1991

INVENTOR(S) : Ricardo H. Reichert and Alberto J. Reichert

It is certified that error appears in the above-identified patent and that said Letters Patent is hereby corrected as shown below:

On the title page please delete the following:

-- [73] Assignee: Schlumberger Industries Limited, Hampshire, England--.

Please change "Attorney, Agent, or Firm—Sanford J. Asman" to read --Attorney, Agent, or Firm—William W. Haefliger--.

Signed and Sealed this

Eighteenth Day of May, 1993

Attest:

MICHAEL K. KIRK

*Attesting Officer*   *Acting Commissioner of Patents and Trademarks*